United States Patent

Sacconi

Patent Number: 6,065,699
Date of Patent: *May 23, 2000

[54] FLY REEL WITH HYDRAULIC DRAG

[76] Inventor: Roberto Luis Sacconi, Chacra 50, Junin De Los Andes, Neuquen 8371, Argentina

[*] Notice: This patent issued on a continued prosecution application filed under 37 CFR 1.53(d), and is subject to the twenty year patent term provisions of 35 U.S.C. 154(a)(2).

[21] Appl. No.: 08/693,970

[22] Filed: Aug. 8, 1996

[51] Int. Cl.[7] .............................................. A01K 89/0155
[52] U.S. Cl. .......................... 242/286; 242/318; 242/295; 254/277
[58] Field of Search .................................... 242/285, 286, 242/295, 302, 318; 254/377

[56] References Cited

U.S. PATENT DOCUMENTS

| | | |
|---|---|---|
| 2,462,974 | 3/1949 | King . |
| 2,462,975 | 3/1949 | King . |
| 2,508,217 | 5/1950 | Brell .......................................... 242/286 |
| 2,607,548 | 8/1952 | Hollander ................................. 242/286 |
| 2,813,601 | 11/1957 | Bourgues . |
| 3,034,604 | 5/1962 | Holmes ..................................... 242/285 |
| 3,255,981 | 6/1966 | Wood, Jr. ................................. 242/285 |
| 3,317,159 | 5/1967 | Morritt ..................................... 242/286 |
| 3,322,269 | 5/1967 | Haenelt, Jr. .............................. 242/285 |
| 3,329,373 | 7/1967 | Wood, Jr. ................................. 242/285 |
| 3,806,060 | 4/1974 | Valentine ................................. 242/295 |
| 4,026,493 | 5/1977 | Anderson . |
| 4,067,512 | 1/1978 | Nepote . |
| 4,352,474 | 10/1982 | Kovalovsky . |
| 4,921,188 | 5/1990 | Smith . |
| 5,120,003 | 6/1992 | Sacconi .................................... 242/317 |
| 5,161,750 | 11/1992 | Hitomi ..................................... 242/285 |
| 5,210,972 | 5/1993 | Collins . |
| 5,393,006 | 2/1995 | Miyazaki et al. ........................ 242/295 |
| 5,542,204 | 8/1996 | Heaney . |

*Primary Examiner*—Katherine A. Matecki
*Attorney, Agent, or Firm*—Malin, Haley & DiMaggio, P.A.

[57] ABSTRACT

A hydraulic drag fly reel for creating drag resistance on fishing line when playing a hooked fish to prevent backlash, wherein the hydraulic drag fly reel comprises a crank plate, a fishing line storage spool connected or mounted to the crank plate by way of a hub extending from the interior of the crank plate, a crank handle connected to the outside of the crank plate for rotating the spool, and a hydraulic drag system including an oil chamber, a turbine disposed in the oil chamber and a gearing system for rotating the turbine within the chamber when releasing line so as to automatically create drag on the fishing line in proportion to the resistance of the fluid in the chamber. The resistive drag automatically adjust in proportion to the force exerted by the hooked fish, especially with accelerated movements.

1 Claim, 4 Drawing Sheets

FLY REEL WITH HYDRAULIC DRAG

BACKGROUND OF THE INVENTION

1. Field of the Invention

The present invention relates generally to fishing reels, and more particularly to a hydraulic drag fly reel for preventing backlash and adjusting drag automatically in the fishing line when reeling a hooked fish.

2. Description of the Prior Art

Conventional fishing reels employ mechanical elements, such as friction plates and speed regulating brakes, pressed against a drag gear or other rotating element to import drag resistance on the spool as a hooked fish runs the line out. The purpose of the drag mechanism is to tire the fish and prevent backlash in the fishing line, a common problem known in fly fishing and one that causes the line to tangle and/or break. A background reel employing a conventional friction plate for drag is shown in FIG. 1. With reference to FIG. 1, the background reel 1 includes a frame 2, a spool 3, a back plate 4, a friction plate 5, and a drag adjustment knob 6. The adjustment 6 is included for manually increasing or decreasing the drag force to assist in fighting and wearing down the fish. Several problems exist with this reel and other background reels. For instance, background drag reels require frequent manual adjustment to maintain proper drag. They cannot be accurately and conveniently adjusted to accommodate the wide range of resistance levels required in playing the hooked fish. Parts used in conventional drag systems experience wear and tear, necessitating frequent replacement. Moreover, background braking devices are incapable of automatically providing adjustable resistance in direct relation to the speed of the hooked fish.

Some of the reels noted in the background art include U.S. Pat. Nos. 2,462,974 and 2,462,975 issued to King, U.S. Pat. No. 2,813,601 issued to Bourgues, U.S. Pat. Nos. 3,255,981 and 3,329,373 issued to Wood, U.S. Pat. No. 3,322,369 issued to Haenelt, U.S. Pat. No. 4,067,512 issued to Népote, and U.S. Pat. No. 4,026,493 issued to Anderson. King, in U.S. Pat. No. 2,813,601, discloses a fishing reel having a hydraulic drive on both sides of the spool to provide a balanced reel. In U.S. Pat. No. 2,462,975, King discloses a modified gear box and clutch connection between the driver impeller shaft and the reel spool. Bourgues, U.S. Pat. No. 2,813,601, discloses a speed regulating brake comprising a torque transmitting device, a brake for controlling torque, means for adapting the rotation speed of the shaft to the power absorbed by the brake, and a pump in fluid communication with an incompressible fluid. Wood, in U.S. Pat. Nos. 3,329,373 and 3,255,981, discloses a fishing reel and brake system comprising a hydraulic system having a pump actuated in response to rotation of the spool. In U.S. Pat. No. 3,322,369, Haenelt discloses a hydraulically actuated tension control for fishing reels comprising a hydraulic actuating means for selectively controlling the interrelated clutching and braking action of the spool to prevent backlash during casting and to maintain line tension, wherein the hydraulic action includes an actuating plunger, master cylinder, slave cylinder, and piston. Népote, U.S. Pat. No. 4,067,512, discloses a hydraulic brake for fishing reels comprising a manually operable lever associated with a piston in a first hydraulic cylinder through which fluid forces are applied to a second piston operating friction plates bearing upon the reel spool. Anderson, U.S. Pat. No. 4,026,493, discloses a hydraulic device for fishing reels comprising a drive hydraulic pump having a drive pump member driven by a manually rotatable handle and a driven hydraulic pump having a drive pump member connected to a winding means for causing the fishing line to be wound upon a spool carried by the frame of a fishing reel. Each of the foregoing devices contemplates either the undesirable friction plate drag device or some type of hydraulic reel, including an actuated pump for controlling different aspects of the reel. The hydraulic pump systems taught are either not designed for causing drag in the line or are complicated in construction and have problems with leakage, pump failure, and slow response time, such that backlash still occurs. As none of these references address the concerns noted above, there remains a need for a fly reel having a hydraulic drag system that is simple in construction and reliable in providing drag resistance, proportionately adjustable to the force of the fish. The instant invention provides such an automatic braking system and addresses the noted problems in the art.

SUMMARY OF THE INVENTION

As a result of the foregoing, it is an object of the present invention to provide a fish reel with automatically adjustable drag to prevent backlash.

It is another object of the instant invention to provide a fly reel drag system that eliminates the need for mechanical drag devices, such as friction plates and speed regulating brakes.

It is also an object of the instant invention to provide a hydraulic drag system for controlling a hooked fish as it runs the line out.

It is a further object of the instant invention to provide a hydraulic drag fly reel.

It is still another object of the instant invention to provide a hydraulic drag fly reel that is simple and inexpensive to manufacture.

In light of these and other objects, the instant invention comprises a hydraulic drag fly reel that employs hydraulic force to produce drag resistance on the reel's spool as a hooked fish runs out the fishing line. The instant invention automatically adjusts the drag force as a fish pulls on the line in direct proportion to the force and speed of the fish to maintain a taut line for preventing backlash. The hydraulic drag fly reel of the instant invention generally comprises a handle mechanically connected to a driving hub, an anti-reverse beveled gear which is engaged with a spring loaded pin, a drag gear journaled in the anti-reverse gear, an oil chamber, and a turbine disposed in the oil chamber in mechanical communication with the drag gear. The oil chamber contains and stores an incompressible fluid of a predetermines viscosity and the turbine. As the fishing reel releases line when playing a hooked fish, the turbine is caused to spin in the oil chamber. The turbine paddles experience a resistive drag force from the fluid, while the oil chamber and fluid layers exert a viscous drag force in adjacent fluid layers. It is believed that the combination of these forces from the chamber, paddle, and fluid layers provides a resultant drag force. This drag force increases with fluids of higher viscosity. The drag system provides the greatest resistance to accelerated movement and discontinuous jerking forces, as is common with a hooked fish, so as to prevent backlash. The hydraulic drag system of the instant invention also provides constant drag resistance to a fleeing fish running out the line. More importantly, however, is the instant invention's ability to keep the line taut. Thus, the greater the force of pull on the line or acceleration, the faster the turbine wants to spin, and the greater the drag force exerted on the turbine by the oil. The drag fly reel thereby controls the hooked fish so that it fatigues more quickly.

The instant invention also has design parameters which may be changed to achieve the desired drag. For instance, the viscosity of the fluid or oil employed will affect drag. Higher viscosity fluids will provide greater resistance to the turbine than low viscosity fluids. The relative size of the turbine as compared to the oil chamber is another factor. A larger turbine within the chamber will produce greater drag. The paddles on the turbine may be pitched to preselected angles to increase or decrease drag. Once the design parameters are selected, drag resistance adjusts to the acceleration, force and speed of the fish. This enables the fisherman to concentrate on landing the fish without having to make continuous adjustments in the drag.

In accordance with these and other objects which will become apparent hereinafter, the instant invention will now be described with particular reference to the accompanying drawings.

DESCRIPTION OF THE PREFERRED EMBODIMENTS

Figure 1:
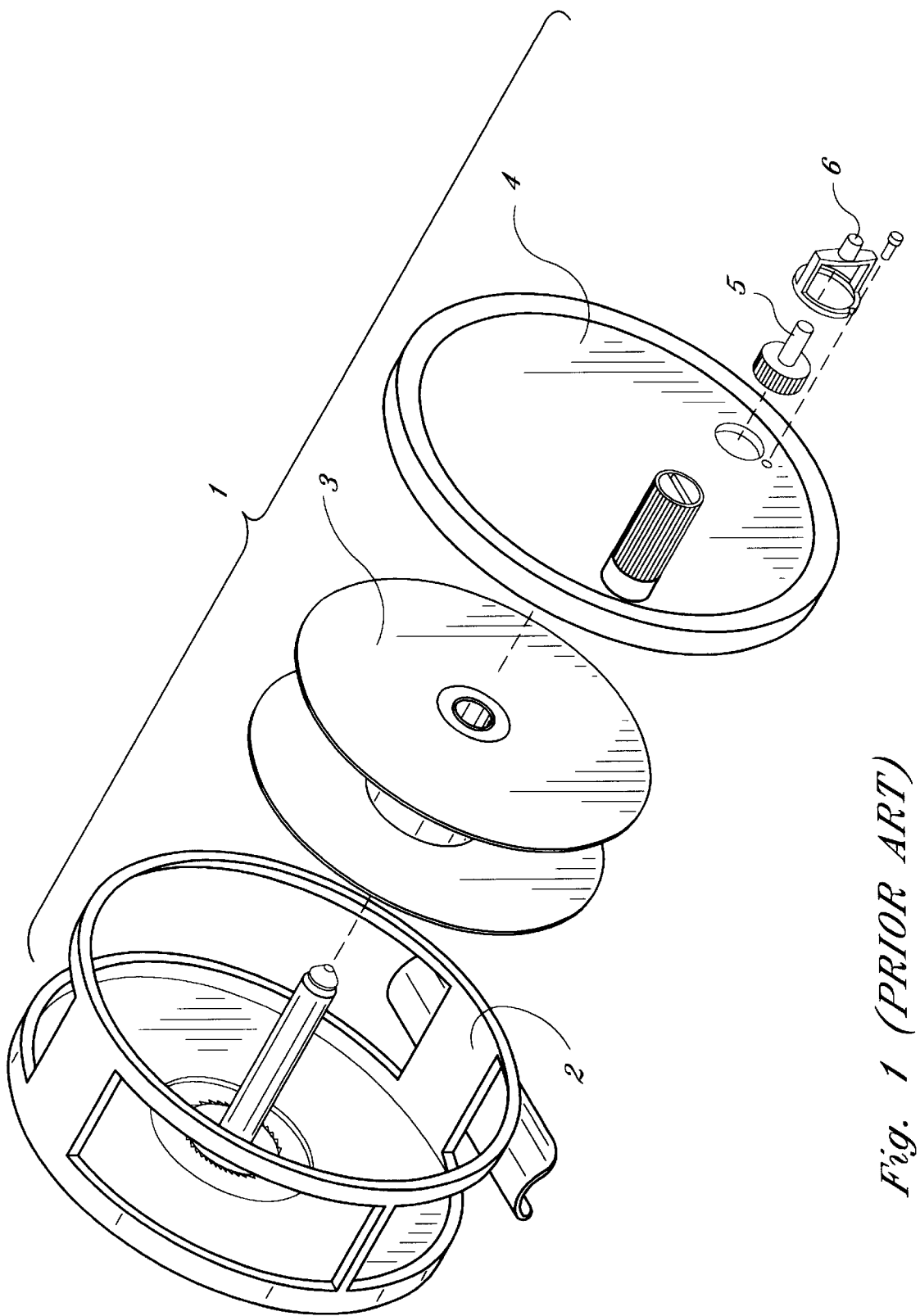
FIG. 1 is an exploded perspective view of a prior art drag fly reel.
Figure 2:
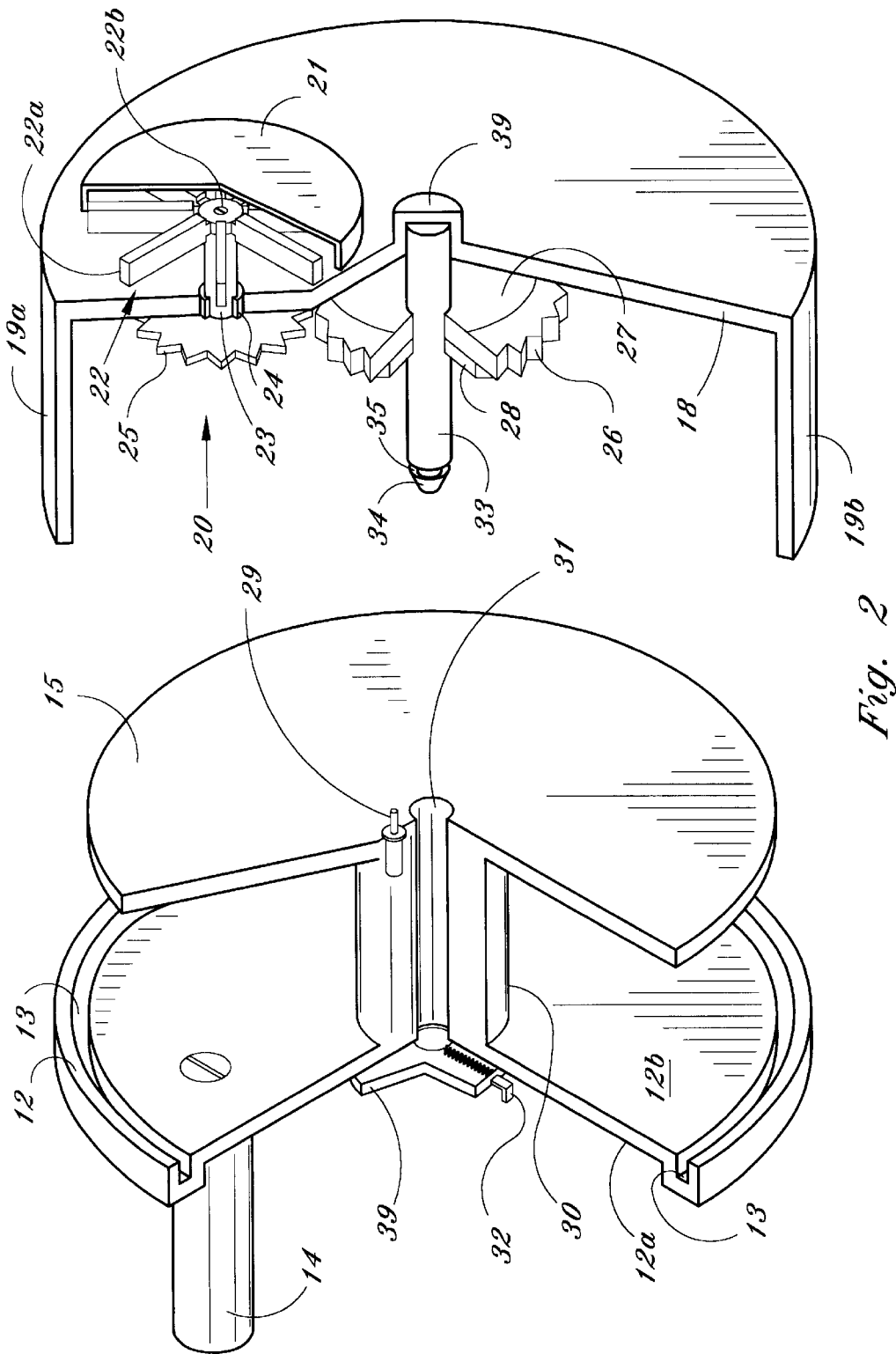
FIG. 2 is a perspective exploded view of the preferred embodiment of the hydraulic drag fly reel of the instant invention.
Figures 3, 3A:
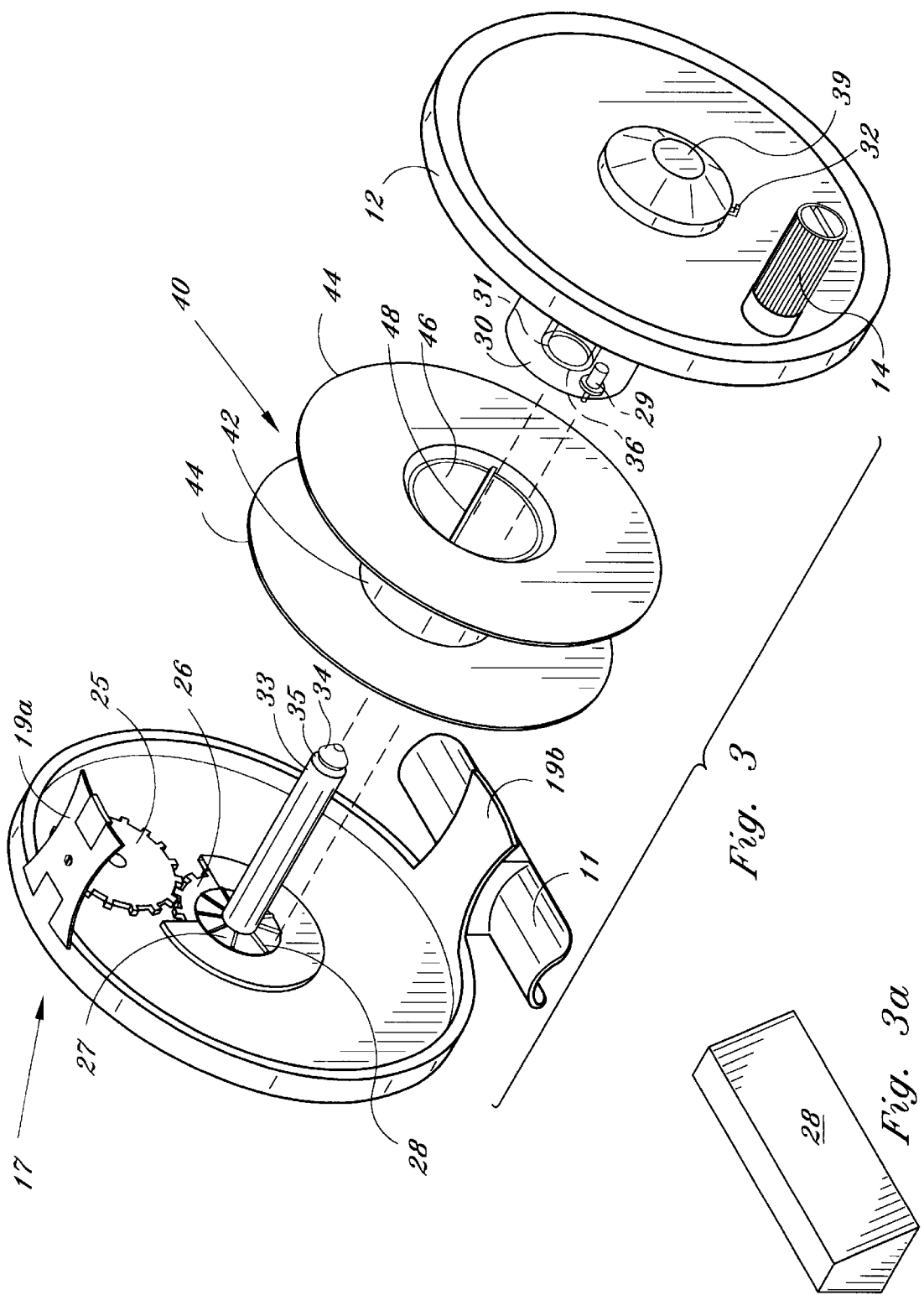
FIG. 3 is an exploded perspective view of another embodiment of the hydraulic drag fly reel of the instant invention.
FIG. 3A is an enlarged perspective view of a beveled vane.
Figure 4:
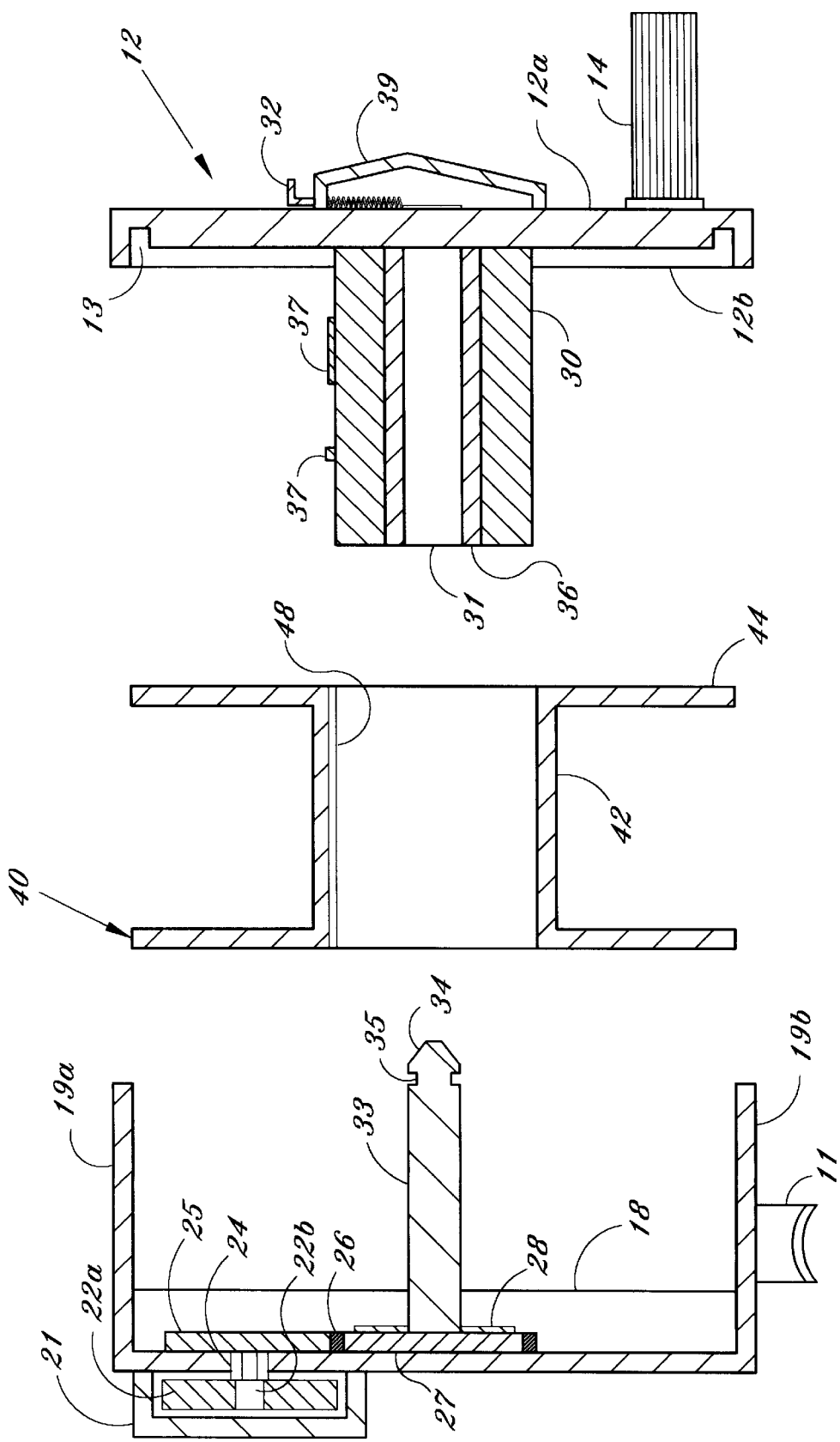
FIG. 4 is an exploded cross sectional view of FIG. 3.

With reference to the drawings, FIGS. 2–4 depict the preferred embodiments of the instant invention, shown generally at 10. The instant invention 10 is comprised of a disk-shaped crank or end plate 12 which is ultimately connected to a fishing reel housing/frame 17 by way of a rigid housing shaft 33 and a corresponding cylindrical driving hub 30 which together support a fishing line spool 15/40.

The disk-shaped crank plate 12 comprises an exterior surface 12a, an interior surface 12b, and a partially raised lip. The cylindrical driving hub 30 projects inwardly from the center of the interior surface 12b. The hub 30 may be mounted to the crank plate 12 with conventional hardware or it may comprise an integrally formed part. The hub 30 defines an open ended sleeve in which a sleeve bushing 36 is permanently fixed. The resulting sleeve 31 mates with the rigid housing shaft 33 in an interlocking fashion. In accordance therewith, a spring loaded locking mechanism 32 is mounted in the crank plate 12 in alignment with the sleeve 31 and engages a locking groove 35 cut into the rigid shaft 33 between a tapered nose end 34 and the main body of the shaft 33. The tapered nose end 34 serves to trigger the spring locking mechanism 32 when the shaft 33 is fully inserted into the sleeve 31. To release the spring locking mechanism 32 and remove the shaft 33, a trigger 38 is conveniently accessible from the exterior surface 12a and secured thereto by a protective cap 39. The protective cap 39 also serves to secure the hub 30 and locking mechanism 32. A handle/crank 14 is also mounted on the exterior surface 12a of the crank plate 12 and is used to rotate the crank plate and thus the spool 15.

The spool of the invention may comprise an integral or connected part 15 of crank plate 12 and the hub 30, or a separate spool piece 40 mountable to the hub 30. With reference to FIG. 2, the spool 15 comprises a second plate 15a mounted with conventional hardware or integrally formed to the hub 30. Accordingly, in this embodiment, the spool 15 comprises the end plate 12, the hub 30, and the second plate 15a, which together support the requisite fishing line. This allows spool 15 to be easily rotated by the handle crank 14.

Referring to FIG. 3, the spool may also comprise a separate, detachable piece 40 so that the user can easily select and change the fishing line with a preloaded spool 40. In this embodiment, the spool 40 comprises a cylindrical axle 42 having disk-shaped plates 44 formed at its end, as is known in the art. The spool axle 42 defines a sleeve 46 having a diameter corresponding to the hub 30 for mounting the spool 40 thereto. A locking pin 37 projects from the hub 30 and a corresponding groove 48 is defined across the axle sleeve 46 such that the two are in alignment and in mating engagement when the spool 40 is mounted to the hub 30. The locking pin 37 and groove 48 secure the spool 40 to the hub 30 to facilitate rotation by the handle crank 14. Also defined by the hub 30 is the sleeve 31 which receives the rigid sleeve 33, as discussed above, when joining the crank plate 12 and housing frame 17.

The housing frame 17 generally comprises a saddle 11 for connecting the fishing reel 10 to a fishing pole, as is known in the art, a raised lip 18 about the annular peripheral edge of the frame 17, a housing shield 19a,b the rigid shaft 33, and the hydraulic drag system 20, representing an inventive feature of the instant invention. The shield 19 comprises an upper shield 19a and a lower shield 19b which is received by the end plate groove 13. The hydraulic drag system 20, in accordance with the instant invention, is discussed in detail hereto.

The hydraulic drag system 20 of the instant invention is pumpless and preferably comprises an oil chamber 21, a turbine 22, a drag gear 25, an anti-reverse gear 26, and a beveled gear 27, as shown in FIGS. 2 and 3. The beveled gear 27 is as known in the background art and preferably comprises a disk-like plate mounted to the base of the rigid shaft 33 and comprises a plurality of raised beveled vanes 28. Referring to FIG. 3A, the raised beveled vanes 28 have a sloped edge and an opposite, perpendicular edge which correspondingly engage the spring loaded pin 29, depending on the direction of rotation. When the crank handle 14 rotates the crank plate in a direction to reel in the fishing line, the spring loaded pin 29 engages the sloped or beveled edge of the vanes 28 such that the spring loaded pin 29 passes over the beveled vanes 28 without causing any rotational movement of the beveled gear 27. In accordance with the instant invention, when a hooked fish is creating tension on the line, the crank plate 12 is caused to rotate in the opposite direction such that the spring loaded pin 29 engages the perpendicular edge of the beveled vanes 28. This in turn causes rotational movement of the beveled gear 27 and hence the anti-reverse gear 26 and drag gear 25.

The anti-reverse gear 26 is concentrically joined on the outer peripheral edge of the beveled gear 27. Thus, it moves along with the beveled gear 27 when a hooked fish is running the line out. The anti-reverse gear 26 has a plurality of teeth which are journaled in corresponding teeth of the drag gear 25. The drag gear 25 comprises a somewhat smaller gear which is positioned in mechanical relation to the turbine 21. The drag gear 25 is joined to the turbine 22 by drag gear shaft 26 as shown in FIGS. 2 and 3. The turbine 21 is positioned inside the oil chamber 21, along with an incompressible oil of a predetermined viscosity, so as to create the requisite drag force when caused to rotate by the drag gear 25. The fluid employed may be an incompressible fluid known in the industry. As the oil chamber is filled with a fluid/oil, a seal 24 is concentrically mounted on the drag gear shaft 23 to prevent leakage from the chamber 21. In accordance with FIGS. 2 and 3, the turbine 22 is caused to rotate when the spring loaded pin 29 engages the perpendicular edge of the beveled gear 27, which causes the anti-reverse gear 26 to rotate the drag gear 25. This is because the plurality of teeth of the anti-reverse gear 26 is journaled or in mechanical communication with the gear teeth of the drag gear 25.

The turbine 22 preferably comprises a plurality of vanes or paddles 22a which project radially from a spindle 22b. The spindle 22b is mounted to the gear shaft 23. The paddles 22a are responsible for creating the ultimate drag force required. As noted above, this drag force is directly proportional to the force exerted by the hooked fish. The size or surface area of the paddles 22a may be increased to achieve greater resistance. The paddles 22a may also be pitched at any predetermined angle or configuration to increase or decrease drag. Moreover, the relative size of the turbine paddles 22a to the oil chamber 21 can effect drag. For instance, the paddles 22a may have a width and height substantially equal to the width and radius of the oil chamber 21 to capture more fluid when rotating.

The hydraulic fly fishing reel 10 of the instant invention provides hydraulically produced drag without any pumps. As noted above, drag resistance is created in a completely closed, pumpless chamber. The combination of the turbine, oil chamber, oil and gear system creates an adjustable drag that varies in direct proportion to the force exerted by the hooked fish. Thus, manual adjustment is not required.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A variable drag hydraulic fly reel for use with a hydraulic fluid in preventing backlash and maintaining drag in a fishing line when landing a hooked fish, said reel comprising:

a spool for storing and supporting the fishing line;

a first frame having a shaft extending therefrom;

a second frame for supporting and rotating said spool, said second frame having a hollow hub extending therefrom for slidably receiving said shaft in a passage defined by said hub, said hub having an outside diameter corresponding to said spool for interchangeably receiving and supporting said spool, said second frame rotating said spool for rotatably reeling in the fishing line in a first mode of operation and letting out the fishing line in a second mode of operation, said second frame includes a handle for imparting rotation on said second frame;

a spring loaded clasp for releasably locking said shaft in said passage;

means for providing a continuous resistive drag force on the fishing line in proportion to a resistive force exerted by the hooked fish in said second mode of operation so as to substantially control tautness in the fishing line, said drag means comprising:

a first gear rotatably attached to said first frame for rotating in said second mode of operation;

a second gear rotatably engaged with said first gear such that said first gear causes said second gear to rotate;

a turbine connected to said second gear by a shaft;

a fluid chamber enclosing said turbine and a fluid of predetermined viscosity, said turbine and said fluid imparting said resistive drag force on said second gear when said turbine is rotated;

said turbine comprises a plurality of paddles having a width and height substantially equal to the width and radius of said fluid chamber to capture more fluid when rotating; clutch means, supported by said hub, for transferring rotational movement of said second frame to said first gear wherein said clutch means comprises:

a plurality of beveled veins projecting from a surface of said first gear, said beveled veins having a sloped side and an opposite side substantially perpendicular to said surface;

a spring loaded pin projecting outward from said hub for engaging said beveled veins, said spring loaded pin engaging said perpendicular side when in said second mode of operation so as to cause said first gear to rotate, said spring loaded pin engaging and over riding said sloped side in said first mode of operation; means for interlocking said spool on said hub comprising:

a tab projecting outward from said hub; and a groove defined in a sleeve of said spool for mating with said tab when said spool is mated with said hub.

* * * * *